(12) United States Patent
Kanjavalappil Raveendranath et al.

(10) Patent No.: US 11,011,987 B2
(45) Date of Patent: May 18, 2021

(54) BOOST CONVERTER WITH IMPROVED STABILITY

(71) Applicant: TEXAS INSTRUMENTS INCORPORATED, Dallas, TX (US)

(72) Inventors: Rejin Kanjavalappil Raveendranath, Thrissur (IN); Aparna Girija, Thiruvananthapuram (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 16/575,617

(22) Filed: Sep. 19, 2019

(65) Prior Publication Data

US 2020/0112250 A1 Apr. 9, 2020

(30) Foreign Application Priority Data

Oct. 8, 2018 (IN) .............................. 201841038038

(51) Int. Cl.
*H02M 3/158* (2006.01)
*H02M 1/12* (2006.01)
*H02M 1/00* (2006.01)

(52) U.S. Cl.
CPC .............. *H02M 3/158* (2013.01); *H02M 1/12* (2013.01); *H02M 2001/0025* (2013.01)

(58) Field of Classification Search
CPC ...... H02M 3/158; H02M 3/1588; H02M 1/12; H02M 2001/0025
See application file for complete search history.

(56) References Cited

U.S. PATENT DOCUMENTS

| | | | |
|---|---|---|---|
| 2006/0176098 A1* | 8/2006 | Chen ..................... | H02M 3/156 327/341 |
| 2012/0308218 A1* | 12/2012 | Galloway ............. | H02M 3/156 396/206 |
| 2013/0314067 A1* | 11/2013 | Matzberger ......... | H02M 3/1588 323/311 |
| 2017/0194858 A1* | 7/2017 | Villot ..................... | H02M 1/32 |
| 2019/0074764 A1* | 3/2019 | Hu ........................ | H02M 3/158 |

* cited by examiner

*Primary Examiner* — Harry R Behm
(74) *Attorney, Agent, or Firm* — John R. Pessetto; Charles A. Brill; Frank D. Cimino (57) ABSTRACT

An apparatus includes a boost converter. The boost converter includes a switch and a boost loop filter coupled to the switch. The boost converter also includes a peak current adjustment circuit coupled to the boost loop filter, wherein the peak current adjustment circuit comprises a comparator and a gain control circuit coupled to differential inputs of the comparator. The boost loop filter is configured to provide a control signal to the switch based on an output voltage of the boost converter and a peak current adjustment provided by the peak current adjustment circuit.

14 Claims, 9 Drawing Sheets

BOOST CONVERTER WITH IMPROVED STABILITY

CROSS-REFERENCE TO RELATED APPLICATIONS

This application claims priority to Indian Provisional Application No. 201841038038, filed Oct. 8, 2018, which is hereby incorporated by reference.

BACKGROUND

Electronic systems use voltage regulators or converters to power analog and digital components. There are many converter architectures and design goals. In a peak current limited boost converter, tight control of the peak current is preferable to maximize efficiency. One related issue is that most battery-operated systems (e.g., mobile phones, tablets, laptops, wearables, etc.) are limited with regard to the instantaneous peak current that is supported. Also, inductor size in portable devices is a limiting factor for peak current. Any error in peak current control affects the power delivery capability of the system.

A common issue due to peak current error is sub-harmonic oscillations in the regulated output (VOUT) when the duty cycle goes above 50%. Applications like audio demands a very stable supply in order to avoid audio tones due to sub-harmonic and/or loop instability. One way to address peak current error is to add a compensation ramp signal to the peak current reference. However, this strategy still results in errors, which often vary significantly over corners

SUMMARY

In accordance with at least one example of the disclosure, an apparatus comprises a boost converter. The boost converter comprises a switch and a boost loop filter coupled to the switch. The boost converter also comprises a peak current adjustment circuit coupled to the boost loop filter. The peak current adjustment circuit comprises a comparator and a gain control circuit coupled to differential inputs of the comparator. The boost loop filter is configured to provide a control signal to the switch based on an output voltage of the boost converter and a peak current adjustment provided by the peak current adjustment circuit.

In accordance with at least one example of the disclosure, a system comprises a boost converter and a battery coupled to an input of the boost converter. The system also comprises a load coupled to an output of the boost converter. The boost converter comprises a switch and a boost loop filter coupled to the switch. The boost converter also comprises a peak current adjustment circuit coupled to the boost loop filter. The peak current adjustment circuit is configured to provide a peak current adjustment to the boost loop filter. The peak current adjustment circuit comprises a comparator and a gain control circuit coupled to differential inputs of the comparator.

In accordance with at least one example of the disclosure, a boost converter comprises a reference current sense node and an inductor current sense node. The boost converter also comprises a peak current adjustment circuit coupled to the reference current sense node and the inductor current sense node. The peak current adjustment circuit comprises a comparator and a gain control circuit coupled to differential inputs of the comparator.

BRIEF DESCRIPTION OF THE DRAWINGS

For a detailed description of various examples, reference will now be made to the accompanying drawings in which.

DETAILED DESCRIPTION

Disclosed herein are boost converter topologies that account for peak current (Ipeak) error without reference current compensation. Instead of reference current compensation, Ipeak error compensation in the disclosed topologies is based on a gain control circuit to adjust the differential inputs to a comparator coupled to a reference current (IREF) sense node and inductor current (IL) sense node. In some examples, the gain control circuit is a capacitive network with programmable switches. In operation, the gain control circuit is configured to apply a first gain (e.g., a 50% gain) to the differential inputs of the comparator while a phase-1 switch is turning on (to ramp up the inductor current) and to apply a second gain (e.g., a 100% gain) to the differential inputs of the comparator after the phase-1 switch is turned on (phase-1 switch on, phase-2 switch off), where the second gain is higher than the first gain. The output of the comparator is used for Ipeak adjustment. In some examples, the Ipeak value used by a boost loop filter of a boost converter is adjusted based on the output of the comparator.

In some examples, a boost loop filter includes a voltage-to-current (V2I) converter and a diode to block current output from the V2I converter. This arrangement represents a stability upgrade relative to other boost loop filters. In some examples, the disclosed boost converter topologies also includes a current limit (I_limit) control circuit configured to correct I_limit in response to Ipeak adjustments. In some examples, the I_limit control circuit scales a predetermined I_limit value based on an input voltage supply (VIN) value for the boost converter, an output voltage supply (VOUT) value for the boost converter, and an adjustable inductor (L) value. In some examples, the VIN and VOUT values are used to select value in a look-up table (LUT). The value output from the LUT is scaled by the adjustable L value. The result of scaling the LUT value is added to the predetermined I_limit value to provide a corrected I_limit value. When the corrected I_limit value is reached, the phase-1 switch is turned off and phase-2 begins (phase-2 switch on, phase-1 switch off). In phase-2, the inductor current ramps down until a minimum threshold value is reached, which triggers ending phase-2 and starting phase-1 again. In the disclosed boost converter topologies, the process of adjusting the Ipeak value for use by the boost loop filter and correcting I_limit is repeated as needed.

The proposed boost converter topologies offer various benefits including Ipeak error compensation based on the inductor current slope. This Ipeak error compensation strategy is immune to inductor variation and phase-1 switch variations (e.g., Rds-on variations). In some examples, the proposed Ipeak error compensation involves slope multiplication based on a capacitor ratio, which is independent of process and temperature variations. Also, no external bias voltage or bias current is needed to perform the proposed Ipeak error compensation. With the proposed Ipeak error compensation, there is still some Ipeak error, which can be accounted for by correcting I_limit. By minimizing the Ipeak error and providing an I_limit correction, utilization of the available peak current from a battery is maximized (the output to the load maximized). Also, the footprint of the boost converter circuit is reduced by choosing an inductor with optimum saturation current limits. Other benefits include automatic scaling of the Ipeak error compensation with duty cycle, and improved stability (less VOUT ripple) across VIN and VOUT conditions. With improved stability, a smaller output capacitor (COUT) is usable, which reduces system cost and size. To provide a better understanding, various boost converter options, Ipeak error compensation options, I_limit correction options, boost loop filter options, and related issues are described using the figures as follows.

Figure 1:
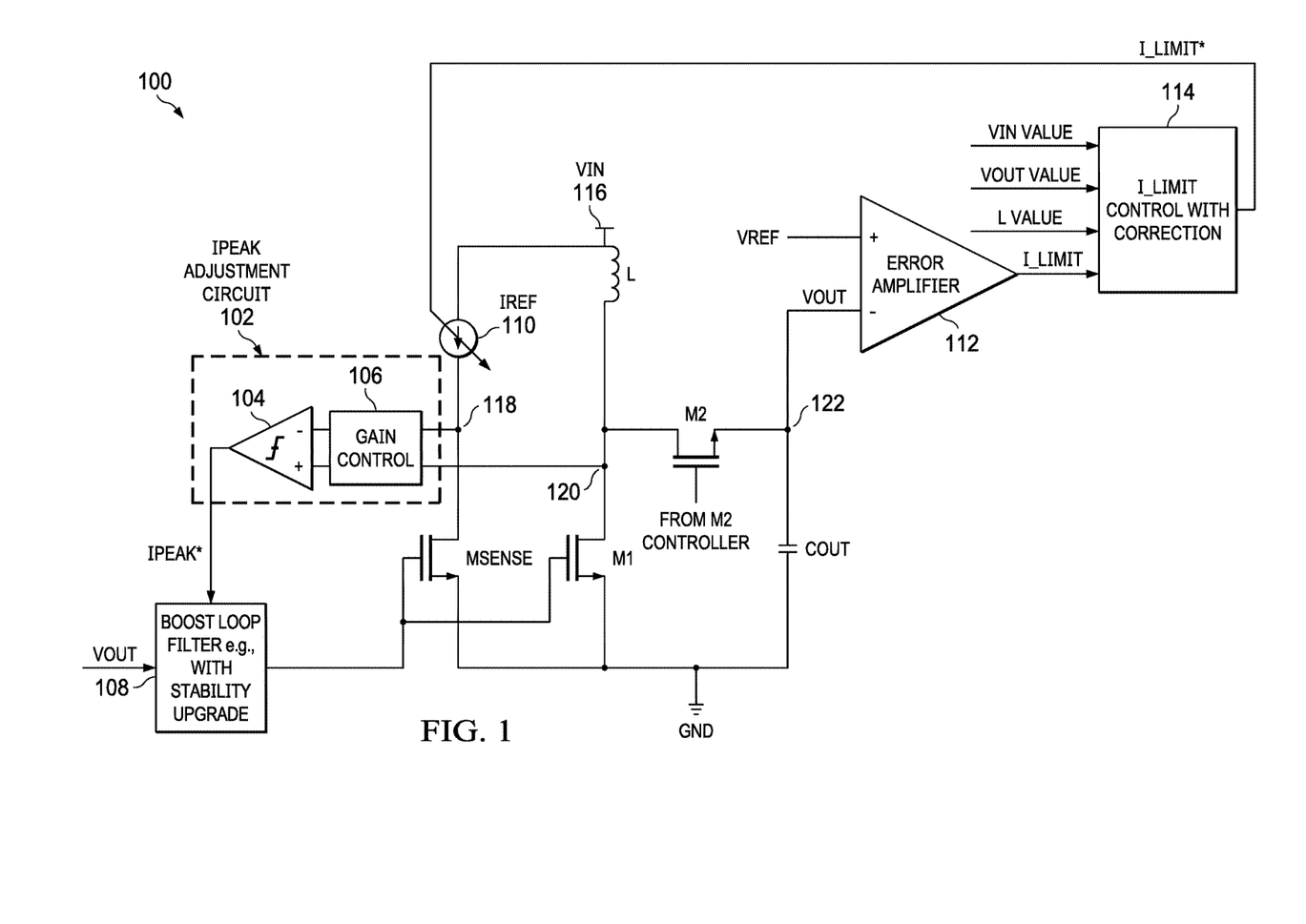
FIG. 1 is a schematic diagram showing a boost converter in accordance with some examples.

FIG. 1 is a schematic diagram showing a boost converter 100 in accordance with some examples. In the example of FIG. 1, the boost converter 100 includes an input voltage supply (VIN) node 116, an inductor (L), a first switch (M1) coupled between L and a ground node (GND), a second switch (M2) coupled between L and an output node 122, and an output capacitor (COUT). In operation, the boost converter 100 operates is two phases, phase-1 and phase-2. In phase-1, M1 is on and M2 is off, and the inductor current is ramped up until a maximum threshold (I_limit). In phase-2, M1 is off and M2 is on, and the inductor current is ramped down to a minimum threshold. The boost converter 100 switches between phase-1 and phase-2 to regulate VOUT at the output node 122.

In the example of FIG. 1, a voltage regulation loop for the boost converter 100 includes an error amplifier 112, an I_limit control circuit 114, a reference current source 110, an Ipeak adjustment circuit 102, and a boost loop filter 108. More specifically, the error amplifier 112 is coupled to the output node 122, where the error amplifier 112 compares VOUT with a reference voltage (VREF). The voltage regulation loop also includes a reference current (IREF) source 110 coupled to the output of the error amplifier 112, where the IREF source 110 is controlled based on the output of the error amplifier 112. In operation, the IREF source 110 sets I_limit. As shown, an I_limit control circuit 114 is also coupled to the IREF source 110, where the I_limit control circuit 114 is able to correct I_limit to account for Ipeak adjustments and different L values.

In some examples, the I_limit control circuit 114 performs I_limit corrections based on a VIN value, a VOUT value, an adjustable L value, and an I_limit value. In one example, the I_limit control circuit 114 includes a digital circuit that receives digitizes values for VIN, VOUT, and L. The VIN and VOUT values are used to select a value from a LUT, and the selected value is scaled based on the provided L value. The scaled result is added as a correction to a predetermined I_limit value (e.g., the output from the error amplifier 112). The corrected I_limit value (I_limit*) is used to control the IREF source 110 (e.g., turn off the IREF source 110 when I_limit* is reached). The result of turning the IREF source 110 off in response to the corrected I_limit value being reached (detected by the output of the error amplifier 112) is that boost converter 100 ends phase-1 and begins phase-2.

When the IREF source 110 is on, the Ipeak adjustment circuit 112 is configured to determine an Ipeak adjustment using a comparator 104 coupled to an IREF sense node 118 and to an inductor current sense node 120 via a gain control circuit 106. In the example of FIG. 1, the IREF sense node 118 is between the IREF source 110 and a sense switch ($M_{SENSE}$) coupled to a ground node, where $M_{SENSE}$ is turned on when M1 is on (during phase-1 when the inductor current ramps up). In some examples, respective voltage values corresponding to the IREF sense node 118 and the inductor current sense node 120 are used by the Ipeak adjustment circuit 112 to determine Ipeak adjustments.

In the example of FIG. 1, the gain control circuit 106 is configured to adjust the gain applied to the differential inputs of the comparator 104. In some examples, the gain control circuit 106 comprises a capacitive network with programmable switches. In one example, the gain control circuit 106 is configured to apply a first gain to the differential inputs of the comparator 104 while M1 is turning on and to apply a second gain to the differential inputs of the comparator 104 after M1 is turned on, where the second gain is higher than the first gain (e.g., the first gain is 50% and the second gain is 100%). In other examples, the gain control circuit 106 is configured to apply at least three different gains to the differential inputs of the comparator 104 during a switching cycle for the M1, where the at least three different gains increase during the switching cycle (e.g., the first gain is 40%, the second gain is 60%, and the third gain is 80%).

The output of the comparator 104 is coupled to the boost loop filter 108, and is used for Ipeak adjustment (Ipeak*). In operation, the boost loop filter 108 provides a control signal to M1 based on VOUT and Ipeak*. The desired behavior of the boost loop filter 108 is represented in the graph 1200 of FIG. 12. More specifically, the boost loop filter 108 decides a particular Ipeak threshold based on VOUT. When the inductor current reaches the Ipeak threshold, a comparator (e.g., the comparator 104) detects it and turns off $M_1$ and $M_{SENSE}$. Also, an example architecture for the boost loop filter 108 is given in FIG. 13. In FIG. 14, the V2I converter 1400 is an example of the V2I converter 1310 represented in FIG. 13. In some examples, the boost loop filter 108 includes stability upgrades, such as the V2I converter 1500 in FIG. 15).

With the boost converter 100, the inductor current is sensed by comparing the voltage across M1 with the voltage across $M_{SENSE}$, when M1 is ON. The current limit (I_limit) is set by the IREF source 110 and the switch resistance ratio of M1 and $M_{SENSE}$. IREF will be defined by the error between VOUT and VREF (a target output voltage), where IREF ramps down with a slope of (VIN-VOUT)/L. When M1 is on (phase-1), IREF increases with a slope of VIN/L. Once IREF reaches I_limit, the control circuit turns off M1. When M1 is off (phase-2), the inductor current falls.

Figure 2:
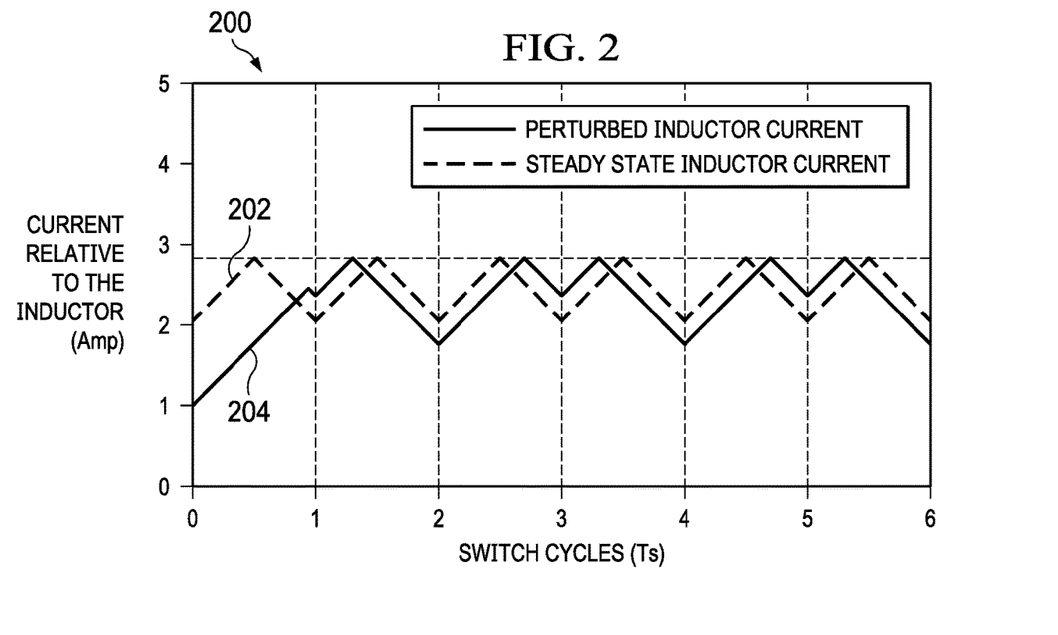
FIG. 2 is a graph showing inductor current waveforms as a function of switch cycles.

FIG. 2 is a graph 200 showing inductor current waveforms 202 and 204 as a function of switch cycles. The waveform 202 is a steady-state inductor current and the waveform 204 is a perturbed inductor current. As shown, the steady-state inductor current waveform 202 maintains a steady minimum value and consistent rise times and fall times for each switch cycle (an ideal scenario corresponding to the peak inductor current being reached at the halfway point of each switch cycle). In contrast, the minimum value for the perturbed inductor current waveform 204 changes and the rise times and fall times are inconsistent across the switch cycles (an undesirable scenario corresponding to the peak inductor current being reached too early or too late during a switch cycle).

Figure 3:
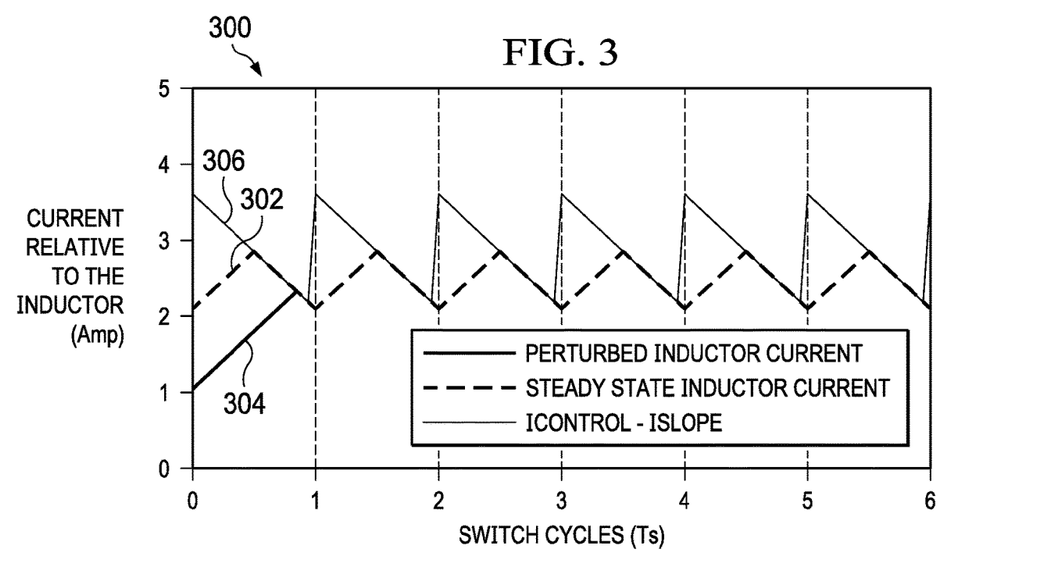
FIG. 3 is a graph showing inductor current waveforms and a related control waveform as a function of switch cycles.

FIG. 3 is a graph 300 showing inductor current waveforms 302 and 304 and a related control waveform 306 as a function of switch cycles. The waveform 302 is a steady-state inductor current and the waveform 304 is a perturbed inductor current. Again, the steady-state inductor current waveform 302 maintains a steady minimum value and consistent rise times and fall times for each switch cycle (an ideal scenario corresponding to the peak inductor current being reached at the halfway point of each switch cycle). The perturbed inductor current waveform 304 is able to follow the steady-state inductor current waveform 302 by application of the control waveform 306, which corresponds to a compensation ramp (Icontrol-Islope). As used herein, Icontrol is the DC threshold at which phase-1 is stopped (inductor current ramp-up), when there is no slope control. Also, Islope is a sawtooth signal added to the main reference (Icontrol) for slope compensation. The control waveform 306 corresponds to Icontrol_with_slope_compensation, which equals Icontrol-Islope.

In one example, if $$\frac{Sf - Se}{Sn + Se} < 1 \text{ and } Sf = \frac{VOUT - VIN}{L} \text{ and } Sn = \frac{VIN}{L},$$

$$\text{then } Se = \frac{\frac{VOUT}{2} - 2VIN}{L}.$$

Also, assume VOUT=12V, VIN=3V, and L=0.47 uH−30%. In such case.

$$\frac{Se}{fs} = \frac{12\,V/2 - 3\,V}{4\,\text{MHz} * 0.3\,\text{uH}} \geq 2.5 \, App.$$

Also, Sf is the positive slope of inductor current in phase-1, Sn is the negative slope of inductor current in phase-2, and Se is the slope introduced in the reference signal (the slope of Islope). Also, App is a peak-to-peak current. In this scenario, the slope has to be >2.5 App to make a stable system with VIN=3V and VOUT=12V. If VIN=3V→5.5V and VOUT=6.5V→13V, the duty cycle=15.4%→77%. The error in I_limit due to the duty cycle change=2.5 A*(0.77−0.154)=1.54 A. In this scenario, an independent ramp may result in significant variations in the slope, and the variations in slope will creates errors which can't be compensated. To reduce these variations, a compensation scheme without a reference current compensation ramp is employed.

Figures 4, 5:
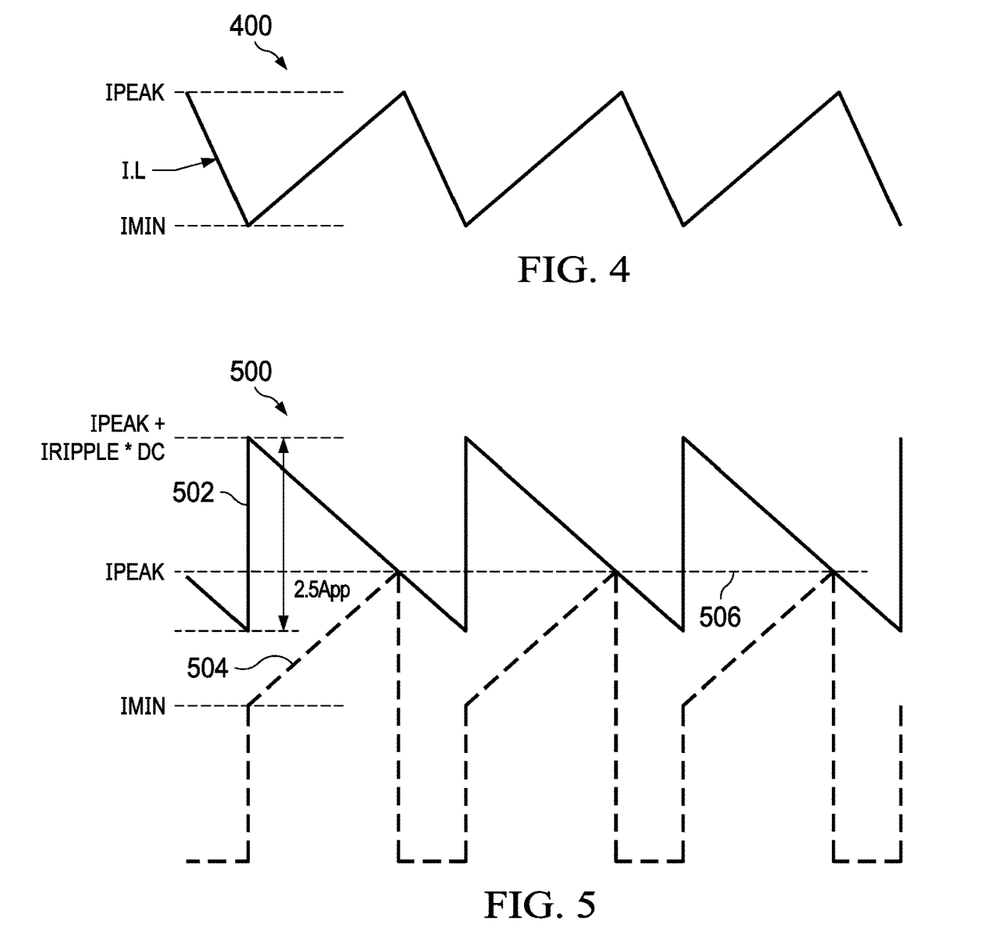
FIG. 4 is a timing diagram showing inductor current as a function of time.
FIG. 5 is a timing diagram showing waveforms related to reference current slope compensation to account for peak current (Ipeak) error in accordance with some examples.

FIG. 4 is a timing diagram 400 showing inductor current (I_L) as a function of time. As shown, I_L transitions up and down between maximum current (Ipeak) and a minimum current (Imin).

FIG. 5 is a timing diagram 500 showing waveforms 502, 504, and 506 related to reference current slope compensation to account for Ipeak error in accordance with some examples. In the timing diagram 500, the waveform 502 is IREF, and the waveform 504 is representative of the current through M1, which is tracked by the voltage across M1. As shown with the waveform 502, IREF is increased above an Ipeak threshold 506, and a negative slope (~2.5 App) is added to IREF. With the compensation ramp, the peak value for IREF=Ipeak+Iripple*Duty_Cycle. In other words, the starting point of IREF is modified based on the switching duty cycle and the slope magnitude in order to avoid errors in the comparator trigger point (when the value of the waveform 504 reaches the Ipeak threshold 506). Since the compensation ramp is generated separately from IREF, the compensation ramp will have process-voltage-temperature (PVT) variations. Also, variations in field-effect transistor (FET) resistance impacts the effective slope magnitude. These uncertainties leaves some error in the compensation ramp technique that are not accounted for.

Figure 6:
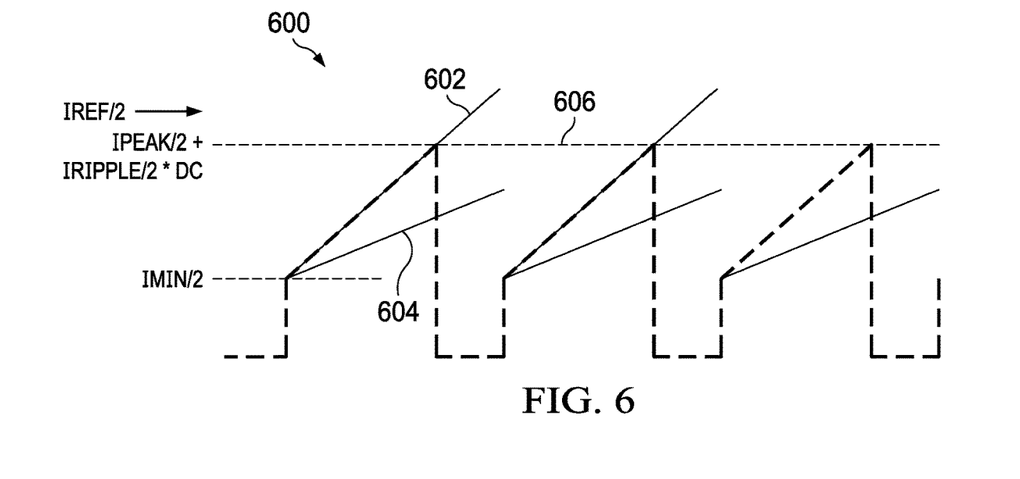
FIG. 6 is a timing diagram showing waveforms related to an ideal compensation to account for Ipeak error in accordance with some examples.

FIG. 6 is a timing diagram 600 showing waveforms 602 and 604 related to an ideal compensation to account for peak current error in accordance with some examples. In the timing diagram 600, the threshold 606 corresponds to IREF/2, which is equal to Ipeak/2+Iripple/2*Duty_Cycle. In the timing diagram, the waveform 602 is representative of a comparator input differential with sensed IREF and sensed inductor current values as inputs. Meanwhile, the waveform 604 is representative of the comparator input differential with a gain of 50% applied. With the compensation represented in the timing diagram, no separate ramp is used. Instead, the sensed IREF and sensed inductor current are passed through a network which changes the gain/attenuation dynamically.

In some examples, the gain is set to 50% while the low-side switch (e.g., M1) is turning ON. After the low-side switch is turned ON, the gain changes to 100%. The 50% gain will attenuate the Duty_Cycle reference by 50%, resulting in a comparator input differential equal to (Iref−Imin)/2. The 100% gain results in a comparator input differential equal to Iref/2−Imin/2−Islope*Duty_Cycle, which is equivalent to Iref−Imin−2*Islope. This will be equivalent to having a negative slope on reference current ramp exactly opposite to the inductor current slope. This scenario is represented in the timing diagram 700 of FIG. 7.

Figure 7:
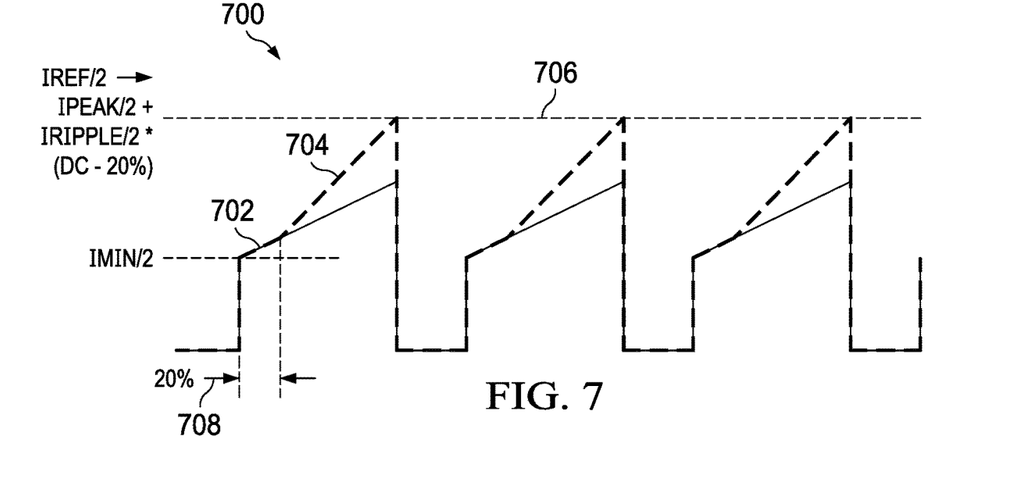
FIG. 7 is a timing diagram showing waveforms related to an example compensation to account for Ipeak error in accordance with some examples.

In the timing diagram 700, threshold 706 represents IREF/2, which is equal to Ipeak/2+Iripple/2*(Duty_Cycle−20%). As represented by the waveform 702 (representative of the comparator input differential), a 50% gain is applied while M1 is turning on during interval 708 (e.g., the first 20% of the switching cycle). As represented by the waveform 704 (representative of the comparator input differential), a gain of 100% is applied after the interval 708. As an example, these different gains are provided by a gain control circuit (e.g., the gain control circuit 106 in FIG. 1) used for Ipeak adjustment as described herein. In some examples, the compensation technique represented in the timing diagram 700 is used if the duty cycle is greater than 50%. Also, the duration of the interval 708 is selected to avoid risk of clock feedback (20% is a suitable value, but not the only suitable value).

Figure 8:
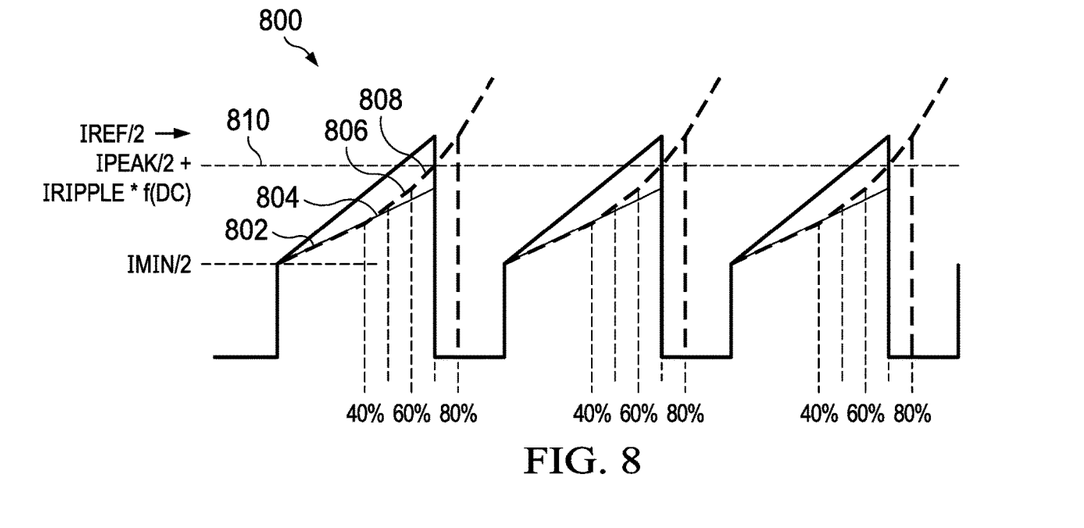
FIG. 8 is a timing diagram showing waveforms related to another example compensation to account for peak current error in accordance with some examples.

FIG. 8 is a timing diagram 800 showing waveforms related to another example compensation to account for Ipeak error in accordance with some examples. The waveforms 802, 804, 806, and 808 are representative of different comparator input differentials due to different gains being applied during a switching cycle for M1. As shown, the waveform 802 corresponds to a first gain (e.g., a 50% gain) applied during a first interval (e.g., 0-40%) of the switching cycle for M1. The waveform 804 corresponds to a second gain (e.g., a 60% gain) applied during a second interval (e.g., 40%-50%) of the switching cycle for M1. The waveform 806 corresponds to a third gain (e.g., a 70% gain) applied during a third interval (e.g., 50%-60%) of the switching cycle for M1. The waveform 808 corresponds to a fourth gain (e.g., an 80% gain) applied during a fourth interval (e.g., 60%-70%) of the switching cycle for M1.

In some examples, the gain applied by a gain control circuit (e.g., the gain control circuit 106 in FIG. 1) will be set to 50% during first 40% of the switching cycle for M1. The gain is increased step by step after every 10%. Also the slope compensation increases with duty cycle. This gradual update is effectively changing the slope compensation with very minimal error on the current comparator output. Since the slope compensation is based on the actual inductor slope, the slope compensation will automatically track changes in inductor value and supports different L values. This predictable error can be reduced further by adjust I_limit as described herein.

Figure 9:
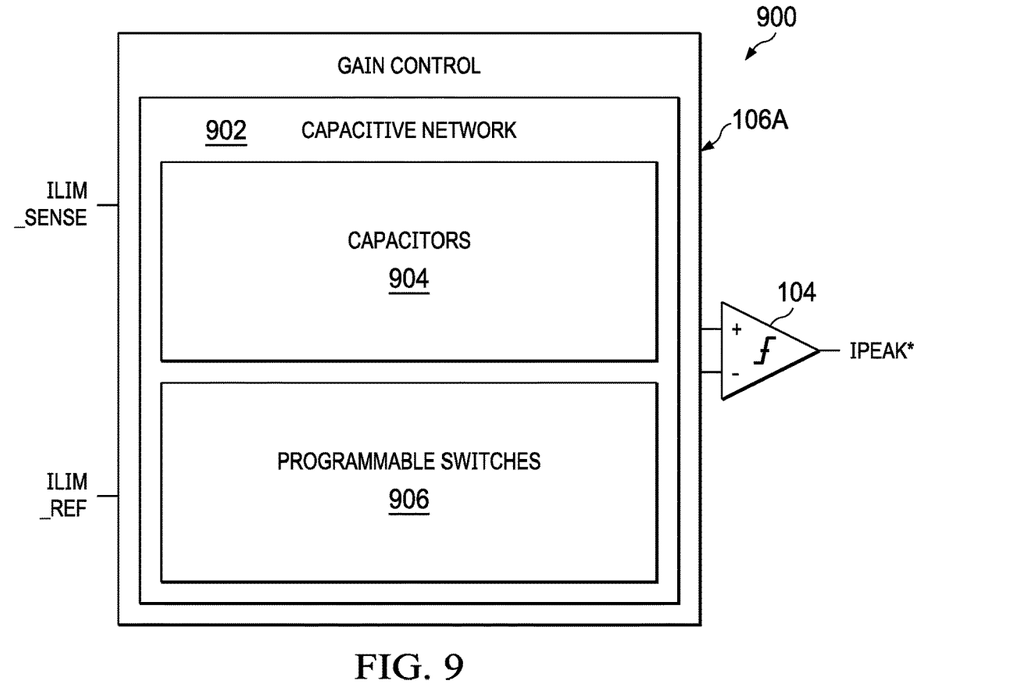
FIG. 9 is a block diagram showing an Ipeak adjustment circuit in accordance with some examples.

FIG. 9 is a block diagram showing an Ipeak adjustment circuit 900 in accordance with some examples. In different examples, the Ipeak adjustment circuit 900 is configured to perform either of the slope compensation options represented in the timing diagrams 700 and 800. In other examples, the Ipeak adjustment circuit 900 is configured to perform other slope compensation options (apply different combinations of gains during the switching cycle of M1). As shown, the Ipeak adjustment circuit 900 includes a gain control circuit 106A (an example of the gain control circuit 106 in FIG. 1) with a capacitive network 902. The capacitive network 902 includes capacitors 904 and programmable switches 906. By adjusting the timing and the combination of programmable switches 906 to be opened or closed, different gains are applied by the capacitors 904 for different intervals of a switching cycle. As shown, the inputs to the gain control circuit 106A include a sensed inductor current value (ILIM_SENSE or another value representing the sensed inductor current at node 120 in FIG. 1) and a sensed IREF value (ILIM_REF or another value representing the sensed IREF current at node 118 in FIG. 1). The outputs from the gain control circuit 106A are the differential inputs for the comparator 104, and the output of the comparator 104 is an Ipeak adjustment value (Ipeak*).

Figure 10:
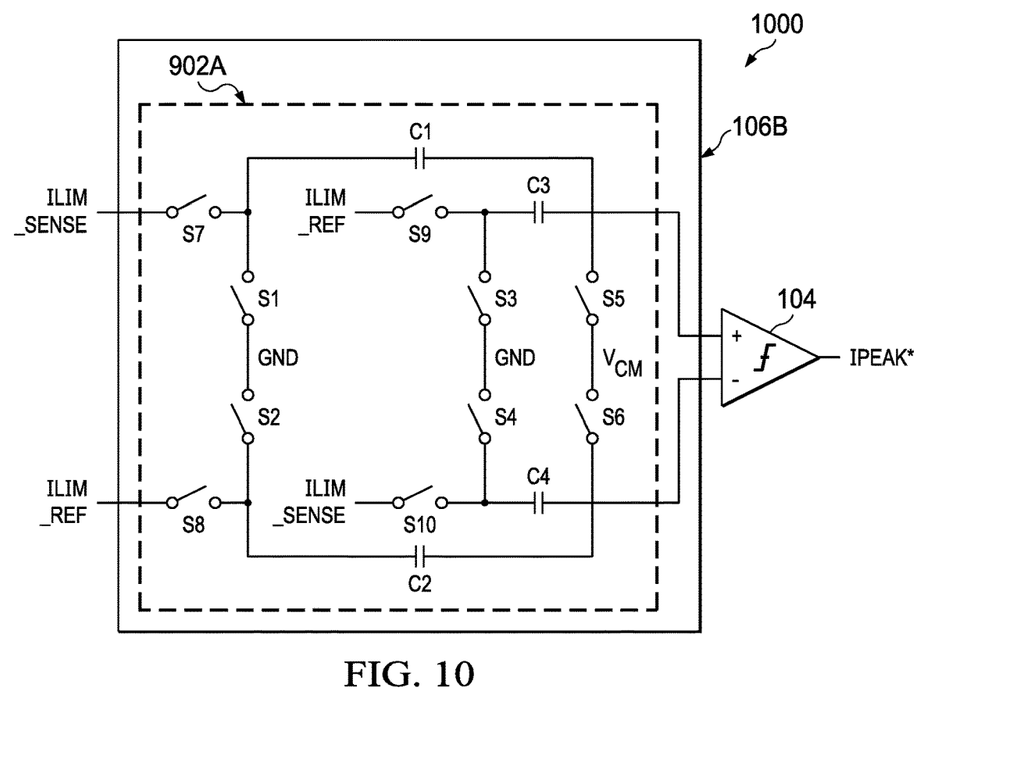
FIG. 10 is a schematic diagram showing an Ipeak adjustment circuit in accordance with some examples.

FIG. 10 is a schematic diagram showing an Ipeak adjustment circuit 1000 in accordance with some examples. In the example of FIG. 10, the Ipeak adjustment circuit 1000 is configured to perform the slope compensation option represented in the timing diagram 700. As shown, the Ipeak adjustment circuit 1000 includes a gain control circuit 106B (an example of the gain control circuit 106 in FIG. 1) with a capacitive network 902A (an example of the capacitive network 902 in FIG. 9). The capacitive network 902A includes various capacitors (C1-C4, where C1=C2 and C3=C4), which are an example of the capacitors 904 in FIG. 9. The capacitive network 902A also includes various switches (S1-S8), which are examples of the programmable switches 906 in FIG. 9. By adjusting the timing and the combination of the switches S1-S8 to be opened or closed, different gains are applied for different intervals of a switching cycle. As shown, the inputs to the gain control circuit 106B include ILIM_SENSE and ILIM_REF. The outputs from the gain control circuit 106B are the differential inputs for the comparator 104, and the output of the comparator 104 is an Ipeak adjustment value (Ipeak*).

In the example of FIG. 10, the gain control circuit 106B creates a differential capacitor division between a reference voltage (ILIM_REF) and a sense voltage (ILIM_SENSE), where ILIM_REF represents the IREF and ILIM_SENSE represents the current through M1). After the first 20% of the switching cycle interval, operation of the switches will change the gain applied, resulting in a simple capacitor coupling with 100% gain.

More specifically, during phase-2 of the related boost converter, S1-S6 will be ON, which will reset C1-C4. At the start of phase-1, S1-S6 are turned off and the switches S5-S10 are turned on. In some examples, C1=C2=3×C3=3×C4, which makes the comparator differential input equal to (ILIM_SENSE−ILIM_REF)/2. After 20% of the switching cycle, S9 and S10 are turned off, so there is no capacitor division after that. The comparator input then tracks whatever changes happen in the input signals with 100% gain. In this manner, the gain control circuit 106B provides 50% attenuation to the Duty_Cycle reference and 100% gain to slope in the signal after the first 20% of the switching cycle. This is equivalent to having double gain for the slope with no attenuation to the reference. So the effective slope is multiplied after normalization. The particular capacitive network 902A of FIG. 10 is compatible with an auto zeroing comparator. In some examples, a simple capacitor divider with programmable switch on one capacitor is enough to implement the proposed gain control.

Figure 11:
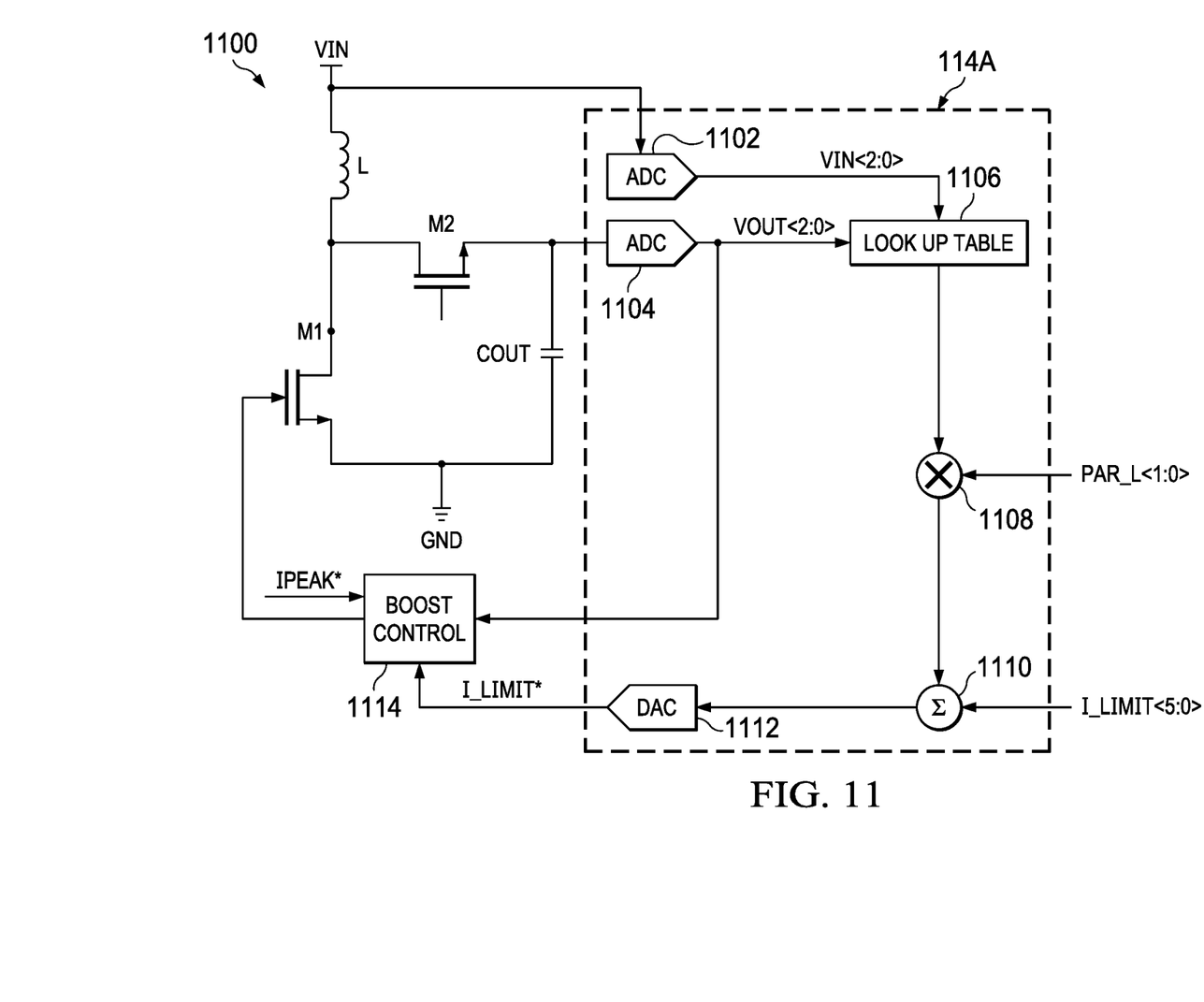
FIG. 11 is a diagram showing a boost converter with current limit (I_limit) control in accordance with some examples.

FIG. 11 is a diagram showing a boost converter 1100 with I_limit control in accordance with some examples. As shown, the boost converter 1100 includes M1, M2, L, the VIN node, the GND node, and COUT described in FIG. 1. In the example of FIG. 11, the boost converter 1100 also includes a boost control circuit 1114 configured to provide a control signal for M1 based on Ipeak*, a VOUT value, and an I_limit correction. In some examples, the boost control circuit 1114 includes a boost loop filter (e.g., the boost loop filter 108 of FIG. 1) configured to use VOUT and Ipeak*. Also, the boost control circuit 1114 includes an IREF source (e.g., the IREF source 110 of FIG. 1) whose operation is based in part of the I_limit correction. In some examples, the Ipeak* value for the boost control circuit 1114 is provided by an Ipeak adjustment circuit (e.g., the Ipeak adjustment circuit 102 in FIG. 1, the Ipeak adjustment circuit 900 in FIG. 9, or the Ipeak adjustment circuit 1000 in FIG. 10). The VOUT value for the boost control circuit 1114 is provided by an analog-to-digital converter (ADC) 1104. The I_limit correction value for the boost control circuit 1114 is provided by an I_limit control circuit 114A (e.g., an example of the I_limit control circuit 114 in FIG. 1).

In the example of FIG. 11, the I_limit control circuit 114A includes an ADC 1102 configured to provide a digital VIN value. The I_limit control circuit 114A also includes an ADC 1104 configured to provide a digital VOUT value. The digital VIN and VOUT values are used to select a value from an LUT 1106. The output of the LUT 1106 is input to a scaling stage 1108 and is scaled based on an adjustable L value (e.g., Par_L<1:0> in FIG. 11). The output from the scaling stage 1108 is input to a summation stage 1110, which adds the output from the scaling stage 1108 to a predetermined I_limit value (e.g., I_limit<5:0> in FIG. 11). The output from the summation stage 1110 is converted to an analog value by a digital-to-analog converter (DAC) 1112. The output of the DAC 1112 is the I_limit correction, which is applied as needed to turn off an IREF source (ending phase-1 and starting phase-2 of the boost converter 1100). In some examples, the ADCs 1102 and 1004, the LUT 1106, the scaling stage 1108, the summation stage 1110, and the DAC 1112 are components of a digital circuit configured to provide an I_limit correction based on VIN, VOUT, and an adjustable L value.

In the proposed boost converter topologies (e.g., the boost converter 1100 of FIG. 11), the compensation slope is generated based on the inductor current slope, resulting in compensation that is immune to inductor variations and immune to Rds-on variations (e.g., for M1). In some examples, slope multiplication is done based on capacitor ratios, resulting in compensation that is independent of PVT variations. Also, no external bias voltage/current required. In the proposed boost converter topologies, a compensation slope that minimizes Ipeak error without significantly impacting I_limit accuracy. This maximizes the utilization available peak input current from the power source (e.g., a battery) and provides the maximum available output to the load. Also, boost converter area is reduced by choosing the inductor with optimum saturation current limits. Also, the proposed compensation slope automatically scales with duty cycle, and improves/optimizes stability across VIN and VOUT conditions. With improved stability, a smaller COUT is possible.

Figure 12:
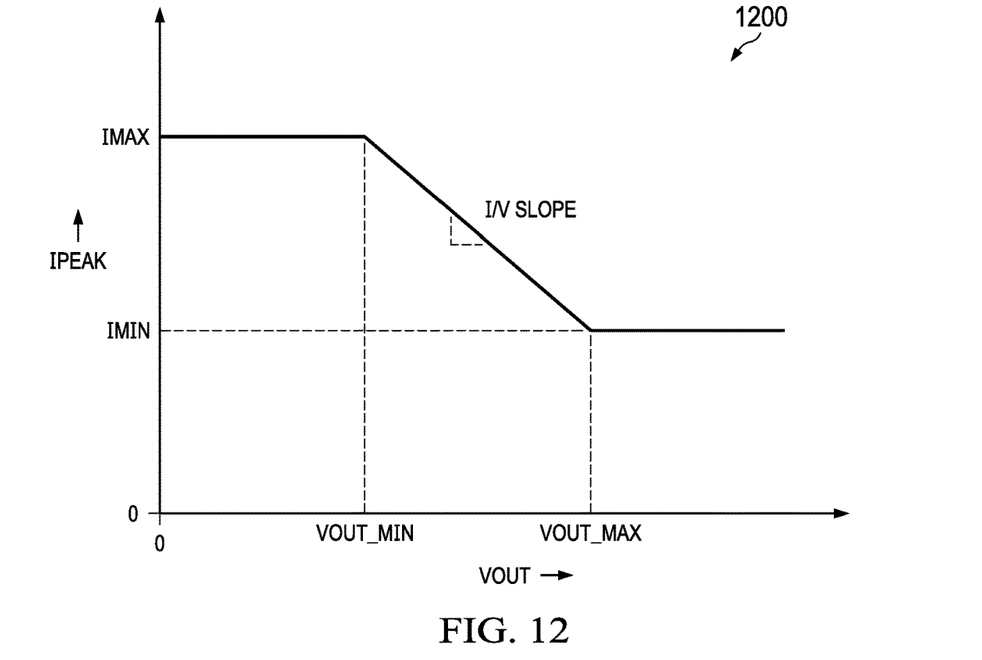
FIG. 12 is a graph showing boost loop filter characteristics in accordance with some examples.

FIG. 12 is a graph 1200 showing boost loop filter characteristics in accordance with some examples. The graph 1200 represents the reaction of a boost loop filter (e.g., the boost loop filter 108 in FIG. 1, or a boost loop filter included with the boost control circuit 1114 of FIG. 11) when the converter VOUT changes due to loading. To make a negative feedback closed loop system, the input (inductor) current has to increase as VOUT decreases (as VOUT error increases with regard to a target voltage). On top of fixed gain, the higher and lower limit for the inductor current is also defined in the graph 1200. The lower current (Imin) limit is related to efficiency optimization. The higher current (Imax) limit is important for the intended system because the inductor current rating as well the supply/battery current capacity are related to this Imax limit.

Figure 13:
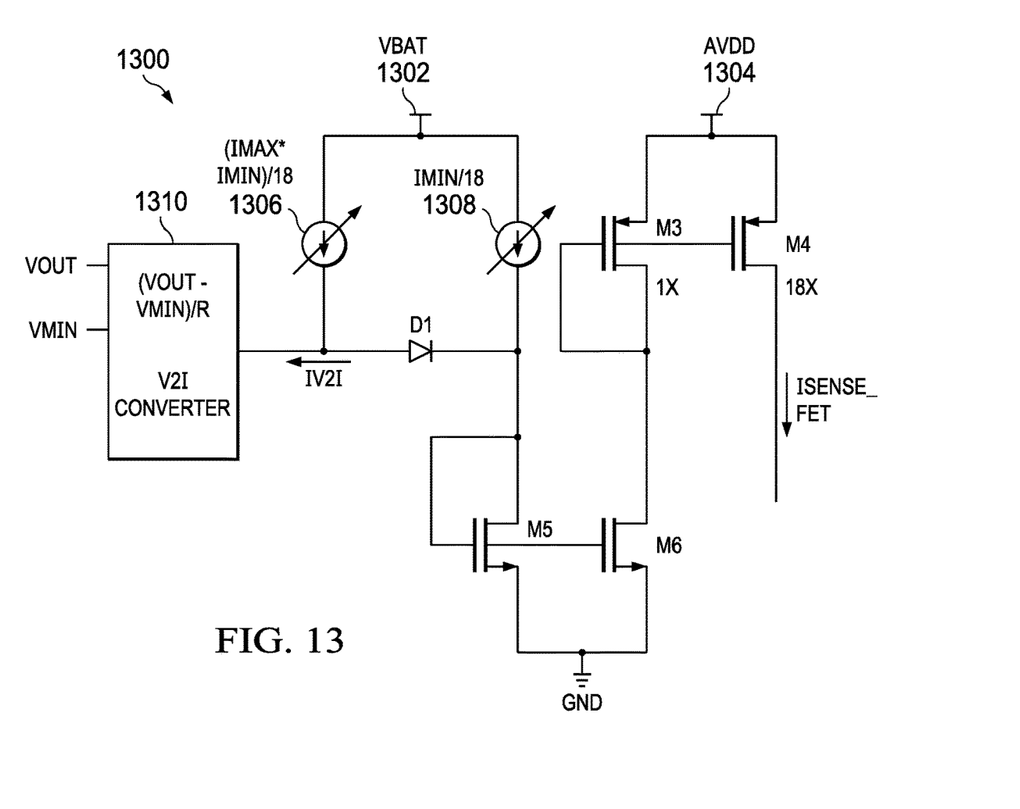
FIG. 13 is a schematic diagram showing a boost loop filter in accordance with some examples.
Figure 14:
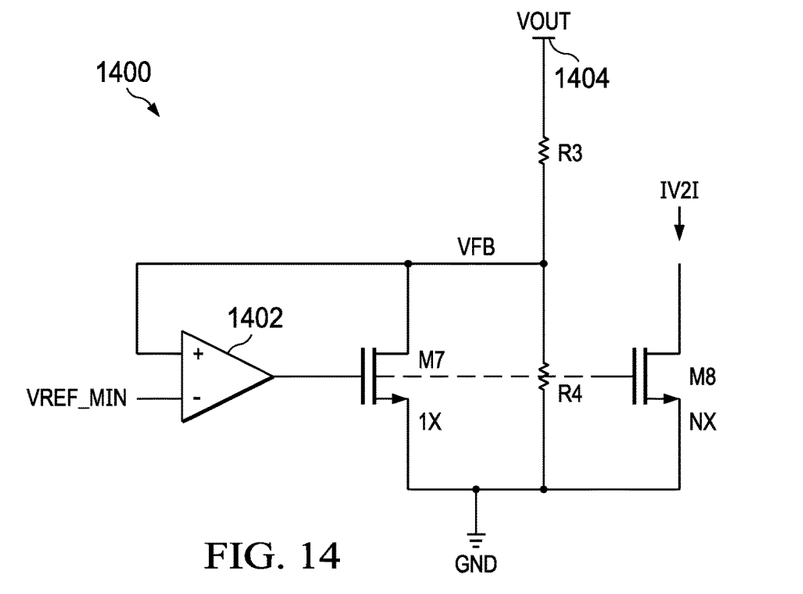
FIG. 14 is a schematic diagram showing a voltage-to-current (V2I) converter for a boost loop filter in accordance with some examples.

FIG. 13 is a schematic diagram showing a boost loop filter 1300 in accordance with some examples. In the example of FIG. 13, the boost loop filter 1300 includes a V2I converter 1310, DACs 1306 and 1308 operating as current sources, and a diode (D1) between the DACs 1306 and 1308. The boost loop filter 1300 also includes a battery voltage supply (Vbat) at node 1302 for the DACs 1306 and 1308. The rest of the boost loop filter 1300 includes various transistors (M3-M6), where the first current terminal and the control terminal of M5 is coupled the cathode of D1, and where the second current terminal of M5 is coupled to a ground node. Also, the control terminal of M6 is coupled to the control terminal of M5, the first current terminal of M6 is coupled to the second current terminal of M3, and the second current terminal of M6 is coupled to the ground node. Also, the first current terminal of M3 is coupled to an input voltage supply (AVDD) node 1304, and the control terminal of M3 is coupled to the second current terminal of M3. Finally, the first current terminal of M4 is coupled to the AVDD node 1304, the control terminal of M4 is coupled to the control terminal of M3, and the second current terminal of M4 receives Isense_FET.

With the boost loop filter 1300, a finite low gain is provided with the characteristics shown in FIG. 12. The lower and upper limit in currents are provided by the split DACs 1306 and 1308 (two identical DACs separated by D1). The slope which determines the gain of the loop is provided by the V2I converter 1310, resulting in a bleeder current (IV2I) that varies as a function of VOUT.

In operation, the V2I converter 1310 sinks a current proportional to the difference between VOUT and Vmin (a target minimum voltage for the boost output, named as Vout_min in graph 1200 of FIG. 12). When VOUT<Vout_min, the current sunk by the V2I converter 1310 becomes zero. Both of current sources 1306 and 1308 will provide current into the NMOS current mirror (M5-M6), resulting in ISENSE_FET=((Imax−min)/18+Imin/18)*18=Imax. The NMOS and PMOS mirrors (M3-M6) are optional way to save power. When VOUT>Vout_max, the current sunk by the V2I converter 1310 will be limited by the current which can be given by the current source 1306 as D1 will not allow any current to be taken from the current source 1308. Thus, the current across D1 will be zero, resulting in ISENSE_FET=0+(Imin/18)*18=Imin. When Vout_min>VOUT>Vout_max, the V2I converter 13010 will be partially sinking current from current source 1306, resulting in ISENSE_FET=((Imax−min)/18−(VOUT−Vout_min)/R+Imin/18)*18=Imax−V_error*k, where V_error=VOUT−Vout_min, and where k is the gain of the system (e.g., k=18/R in the example given). Neither the mirror ratio nor R affects the desired function of the boost loop filter 1300.

In some scenarios, a boost loop filter (e.g., the boost loop filter 108 of FIG. 1, or the boost loop filter 1300 of FIG. 13) is used with a boost converter for an audio application with very low finite loop gain. The reasons for the boost loop filter in these scenarios is to provide controlled load regulation with reduced crest in the input current. Also, low loop gain gives better stability even at lower output capacitor values. Also, high power supply rejection ratio (PSRR) of class-D allows significant load regulation of the boost converter to be accommodated.

FIG. 14 is a schematic diagram showing a V2I converter 1400 (an example of the V2I converter 1310 of FIG. 13) for a boost loop filter (e.g., the boost loop filter 108 of FIG. 1, or the boost loop filter 1300 of FIG. 13) in accordance with some examples. As shown, the V2I converter 1400 includes an operational amplifier 1402 with a feedback voltage (Vfb) at its positive input node and a minimum reference voltage (Vref_min) at its negative input node. The output of the operational amplifier 1402 controls transistors, M7 and M8. As represented in FIG. 14, M8 is n times larger than M1. As shown, Vfb is a function of VOUT and a voltage divider (R3 and R4 between a VOUT node 1404 and a ground node). When Vfb is greater than Vref_min, M7 and M8 are turned on and a bleeder current (IV2I) is provided by the V2I converter 1400.

In the example of FIG. 14, the loop control Vfb=Vref_min. When VOUT increases, the delta current from R3 will flow through M7. This will be mirrored by M8 and used as the V2I output current (Iout). When VOUT=Vout_min, Vfb equals Vref_min with IFB=0. This leads to crashing of the unity gain bandwidth (UGB) due to zero current in the final stage (M7). The UGB of the V2I converter 1400 acts as a pole in the overall boost transfer function. So closure to Vout_min (or Imax) boost stability degrades due to improper bias in the V2I converter 1400.

In the example of FIG. 14, the total loop gain of the V2I converter 1400 is defined by the error-amplifier and output stage (e.g., the size of M1 and the values for R3 and R4). The current sinks by the V2I converter 1400 become zero when VOUT=Vmin (the time at which boost supposed to run with max current limit). At this time, current on M7 and M8 become zero, which results into extremely low Gm for M7. This will make the bandwidth very low and increase the effective delay from input to output of a boost control circuit (e.g., the boost control circuit 1114). This high delay acts as pole in the overall boost loop and negatively affects the boost stability. To account for this instability (low frequency pole), a larger COUT value is needed.

Figure 15:
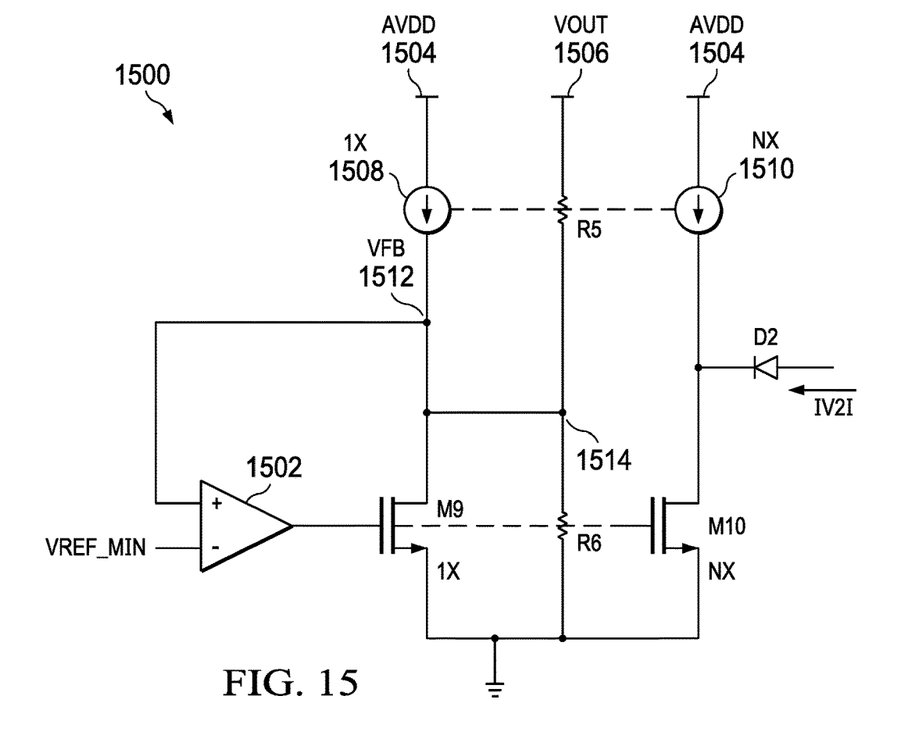
FIG. 15 is a schematic diagram showing another V2I converter for a boost loop filter in accordance with some examples.

In another V2I converter examples, this issue is solved by adding additional bleeder current, where the additional bleeder current on the mirror is used to avoid errors due to the original bleeder current. FIG. 15 is a schematic diagram showing another V2I converter 1500 (an example of the V2I converter 1310 of FIG. 13) for a boost loop filter (e.g., the boost loop filter 108 of FIG. 1, or the boost loop filter 1300 of FIG. 13), where the V2I converter 1500 solves the stability issues noted for the V2I converter 1400

As shown, the V2I converter 1500 includes an operational amplifier 1502 with a feedback voltage (Vfb) provided by node 1512 at its positive input node and a minimum reference voltage (Vref_min) at its negative input node. The output of the operational amplifier 1502 controls transistors, M9 and M10. Also, the first current terminal of M9 is coupled to the Vfb node 1512, which is coupled to the positive input node of the operational amplifier 1502, the current source 1508, and a middle node 1514 between R5 and R6. Also, the first current terminal of M10 is coupled to the cathode of D2 and to the current source 1510. The second current terminals of M9 and M10 are coupled to a ground node. As represented in FIG. 15, M10 is n times larger than M9.

In operation, Vfb is a function of VOUT and a voltage divider (R5 and R6 between a VOUT node 1506 and a ground node). Also, VFB is a function of the current source 1508, which is mirrored from the current source 1510 via M9 and M10. When Vfb is greater than Vref_min, M9 and M10 are turned on and a bleeder current (IV2I) is provided by the V2I converter 1500, where IV2I in FIG. 15 is increased relative to the IV2I in FIG. 14 due to the additional bleeder current provided by the current source 1508. Even with this modified bleeder current the stability issues are not solved. Rather, the modified bleeder current simply adds to the Imax and moves the VOUT value at which Imax is encountered. To solve the stability issue, D2 is added to the V2I converter 1500, where the cathode of D2 faces the first current terminal of M10 and the current source 1510. Now the characteristic will be saturated exactly at Vout_min at the same time the V2I converter 1500 will be biased properly. The V2I bias crashing will happen only when VOUT goes below Vout_min. Since the boost loop is already saturated at this point, the UGB crashing doesn't have any impact.

Compared to the V2I converter 1400 of FIG. 14, the V2I converter 1500 of FIG. 15 adds the current sources 1508 and 1510 and uses a similar size ratio for M9 and M10 (compared to M7 and M8 in FIG. 14). Also, D2 is added to block the current going out of the V2I converter 1500. With these additions, M9 and M10 will have a finite amount of current even when the expected output current is zero. This will avoid low bandwidth and a low frequency pole in the boost loop. So stability issues due the additional pole during max current limit scenarios is fixed using the V2I converter 1500 without increasing the output capacitor unnecessarily.

Figure 16:
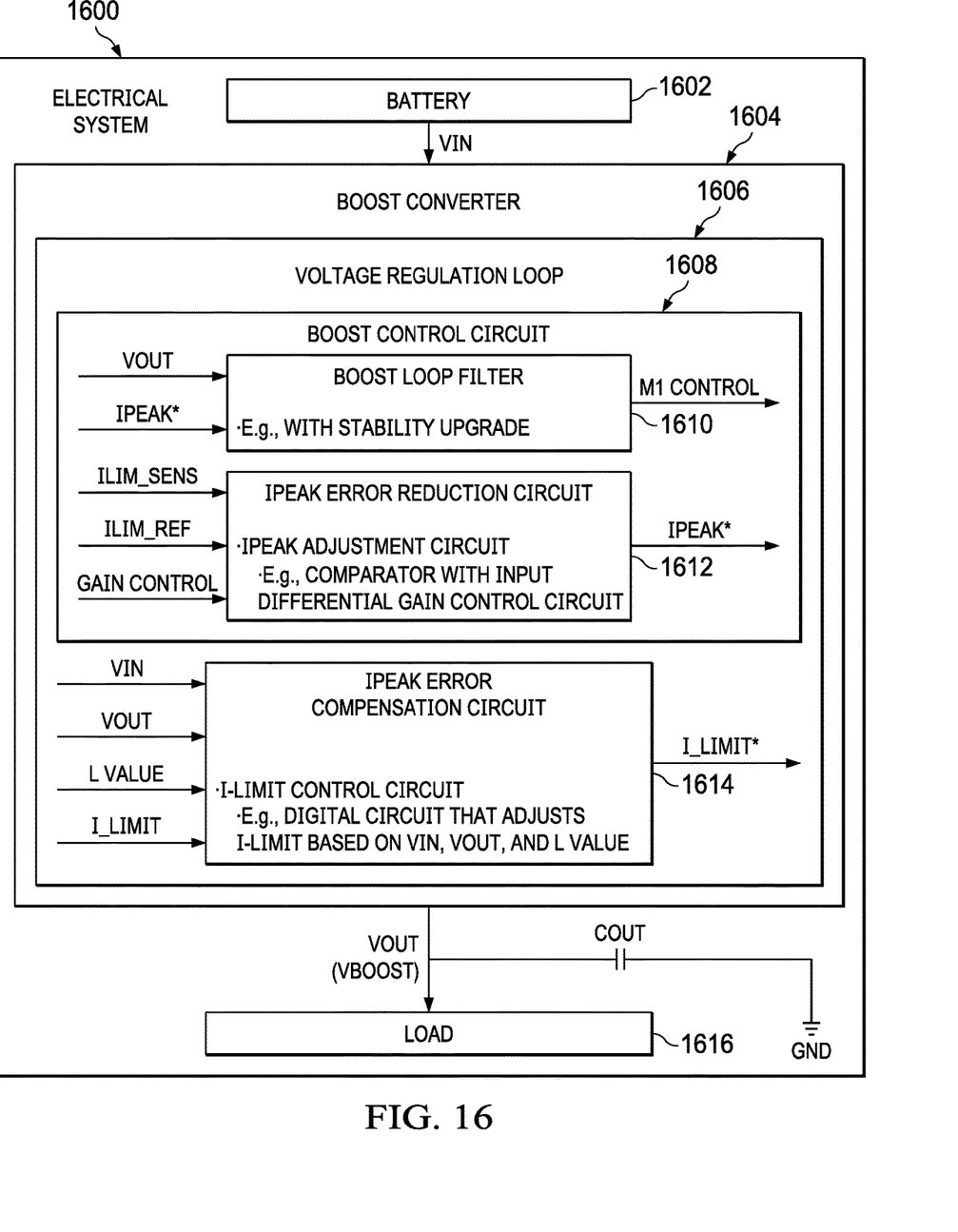
FIG. 16 is a block diagram of an electrical system in accordance with some examples.

FIG. 16 is a block diagram of an electrical system 1600 with a boost converter topology as disclosed herein. The electrical system 1600 in an example of a battery-powered electronic device, such as a smart phone, a wearable, a tablet computer, or other battery-powered electronic device. As shown, the electrical system 1600 includes a battery 1602 (e.g., different batteries provide voltages in the range of 5-40 Volts) coupled to a boost converter 1604, where the boost converter 1604 provides VOUT (sometimes referred to as Vboost) to a load 1616 based on VIN from the battery 1602 (or a regulation circuit between the battery 1602 and the boost converter 1604). The boost converter 1604 (an example of the boost converter 100 in FIG. 1, or the boost converter 1100 in FIG. 11) includes a voltage regulation loop 1606 with a boost control circuit 1508. For example, relating the boost converter 1604 of FIG. 16 to the boost converter 100 of FIG. 1, the voltage regulation loop 1606 corresponds to the various components used to regulate VOUT based on VIN, including M1, M2, L, the error amplifier 112, the I_limit control circuit 114, the Ipeak adjustment circuit 102, the IREF source 110, Msense, and the boost loop filter 108. Also, relating the boost converter 1604 of FIG. 16 to the boost converter 1100 of FIG. 1, the voltage regulation loop 1606 corresponds to the various components used to regulate VOUT based on VIN, including M1, M2, L, the boost control circuit 1114, and the I_limit control circuit 114A.

In the example of FIG. 16, a boost control circuit 1608 is represented as having boost loop filter 1610 and an Ipeak error reduction circuit 1612. Relating the boost control circuit 1608 of FIG. 16 to the components of FIG. 1, the boost loop filter 1610 corresponds to the boost loop filter 108 in FIG. 1, and the Ipeak error rejection circuit 1612 corresponds to the Ipeak adjustment circuit 102 in FIG. 1. Relating the boost control circuit 1608 of FIG. 16 to the components of FIG. 11, the boost control circuit 1608 corresponds to the boost control circuit 1114 in FIG. 11.

As represented in FIG. 16, the voltage regulation loop 1606 also includes an Ipeak error compensation circuit 1614, which corresponds to the I_limit control circuit 114 in FIG. 1, or the I_limit control circuit 114A in FIG. 11. In operation, the Ipeak error compensation circuit 1614 is configured to provide a corrected I_limit value (labeled I_limit* in FIGS. 1 and 16) based on a VIN value, a VOUT value, and an adjustable L value. The I_limit* value is used to turn off an IREF source (e.g., the IREF source 110 in FIG. 1). Also, the Ipeak error reduction circuit 1612 is configured to provide an Ipeak adjustment (Ipeak*) based on ILIM_SENSE, ILIM_REF, and a gain control scheme so that the differential between ILIM_SENSE and ILIM_REF is adjusted during a switching cycle for M1 as described herein. The boost loop filter 1610 is configured to control M1 based on VOUT and Ipeak*. In some examples, the boost loop filter 1610 includes stability upgrades (e.g., the V2I converter 1500 arrangement described in FIG. 15). With the boost control circuit 1608 and the Ipeak error compensation circuit 1614, stability of the boost converter 1604 is improved compared to other boost converter topologies.

In some examples, a system (e.g., the electrical system 1600 of FIG. 16) includes a boost converter (e.g., the boost converter 100 in FIG. 1, the boost converter 1100 in FIG. 11, or the boost converter 1606 in FIG. 16). The system also includes a battery (e.g., the battery 1602 in FIG. 16) coupled to an input of the boost converter. The system also includes a load (e.g., the load 1616 in FIG. 16) coupled to an output of the boost converter. The boost converter includes a switch (e.g., M1 in FIGS. 1 and 11) and a boost loop filter (e.g., the boost loop filter 108 in FIG. 1, or the boost loop filter 1610 in FIG. 16) coupled to the switch. The boost converter also includes a peak current adjustment circuit (e.g., the Ipeak adjustment circuit 102 in FIG. 1, or the Ipeak error reduction circuit 1612 in FIG. 16) coupled to the boost loop filter. The peak current adjustment circuit is configured to provide a peak current adjustment (e.g., Ipeak* in FIGS. 1 and 16) to the boost loop filter. In some examples, the peak current adjustment circuit includes a comparator (e.g., the comparator 104 in FIGS. 1, 9, and 10). The peak current adjustment circuit also includes a gain control circuit (e.g., the gain control circuit 106 in FIG. 1, the gain control circuit 106A in FIG. 9, or the gain control circuit 106B in FIG. 10) coupled to differential inputs of the comparator. The boost converter further comprises a current limit control circuit (e.g., the I_limit control circuit 114 in FIG. 1, the I_limit control circuit 114A in FIG. 11, or the Ipeak error compensation circuit 1614 in FIG. 16) configured to adjust a current limit of the boost converter based in response to the peak current adjustment (e.g., Ipeak*) provided by the peak current adjustment circuit.

In some examples, the current limit control circuit is configured to adjust the current limit based on a VIN value of the boost converter, a VOUT value of the boost converter, and an adjustable inductor value (e.g., the L value in FIG. 1, or Par_L<1:0> in FIG. 11). In some examples, the gain control circuit comprises a capacitive network (e.g., the capacitive network 902 in FIG. 9, or the capacitive network 902A in FIG. 10) with programmable switches (e.g., the programmable switches 906 in FIG. 9, or S1-S10 in FIG. 10), where the gain control circuit is configured to apply a first gain to the differential inputs of the comparator while the switch (e.g., M1) is turning on and to apply a second gain to the differential inputs of the comparator after the switch (e.g., M1) is turned on, and where the second gain is higher than the first gain.

In some examples, a V2I converter (e.g., the V2I converter 1500 in FIG. 15) configured to add bleeder current (equal to a minimum bias current or "Ibias_min") to a feedback node (e.g., node 1512). The bleeder current is a DC current to keep the operational amplifier 1502 in biased condition. When the output current is zero this bleeder current will be the only current through the NMOS in the final stage. With the bleeder current, the minimum UGB of the operational amplifier 1502 is maintained across input/output conditions. The V2I converter also includes a diode configured to block current output from the V2I converter.

In some examples, an apparatus (e.g., a chip, electronic circuit, and/or printed circuit board (PCB) with one or more integrated circuits and/or discrete components) includes a boost converter (e.g., the boost converter 100 of FIG. 1, the boost converter 1100 of FIG. 11, or the boost converter 1604 of FIG. 16). The boost converter includes a switch (e.g., M1) and a boost loop filter (e.g., the boost loop filter 108 in FIG. 1, of the boost loop filter 1610 in FIG. 16) coupled to the switch. The boost converter also includes an Ipeak adjustment circuit (e.g., the Ipeak adjustment circuit 102 in FIG. 1, or the Ipeak error reduction circuit 1612 in FIG. 16) coupled to the boost loop filter, wherein the peak current adjustment circuit comprises a comparator (e.g., the comparator 104 in FIGS. 1, 9 and 10) and a gain control circuit (e.g., the gain control circuit 106 in FIG. 1, the gain control circuit 106A in FIG. 9, or the gain control circuit 106B in FIG. 10) coupled to differential inputs of the comparator. Also, the boost loop filter is configured to provide a control signal to the switch (e.g., M1) based on an VOUT of the boost converter and a peak current adjustment (Ipeak*) provided by the peak current adjustment circuit.

In some examples, the gain control circuit comprises a capacitive network with programmable switches (e.g., the capacitive network 902 with programmable switches 906 in FIG. 9, or the capacitive network 902A with S1-S10 in FIG. 10). In some examples, the gain control circuit is configured to apply a first gain to the differential inputs of the comparator while the switch (e.g., M1) is turning on and to apply a second gain to the differential inputs of the comparator after the switch (e.g., M1) is turned on, and wherein the second gain is higher than the first gain. In some examples, the first gain is 50% and the second gain is 100%. In some examples, the gain control circuit is configured to apply at least three different gains to the differential inputs of the comparator during a switching cycle for the switch (e.g., M1), and wherein the at least three different gains increase during the switching cycle (see e.g., the example of FIG. 8).

In some examples, the boost converter includes a reference current source (e.g., the IREF source 110) coupled to a first input of the gain control circuit and configured to provide a reference current (IREF). The boost converter also includes an inductor (e.g., L in FIGS. 1 and 11) coupled to a second input of the gain control circuit, wherein the comparator is configured to compare a scaled differential voltage output from the gain control circuit, wherein the scaled differential voltage is based on a first voltage value corresponding to the reference current and a second voltage value corresponding to an inductor current.

In some examples, the boost converter includes a current limit control circuit (e.g., the I_limit control circuit 114 in FIG. 1, or the I_limit control circuit 114A in FIG. 11) configured to provide a corrected current limit (I_limit*) based on a VIN value, a VOUT value, an L value, and an I_limit value (e.g., from the error amplifier 112). In some examples, the current limit control circuit accounts for different inductor values. In some examples, the current limit control circuit includes a digital LUT of values (e.g., the LUT 1106 in FIG. 11) that are selectable based on a VIN value and an VOUT value of the boost converter. The current limit control circuit also includes a scaling stage configured to scale an output of the LUT based on an adjustable inductor value (e.g., Par_L<1:0> in FIG. 11). The current limit control circuit also includes a summation stage configured to add an output of the scaling stage to a predetermined current limit value (e.g., I_limit<5:0> in FIG. 11).

In some examples, the boost loop filter includes a V2I converter (e.g., the V2I converter 1500 in FIG. 15) configured to add bleeder current (IV2I) to a feedback node (Vfb). The V2I converter also includes a diode configured to block current output from the V2I converter.

In this description, the term "couple" or "couples" means either an indirect or direct wired or wireless connection. Thus, if a first device couples to a second device, that connection may be through a direct connection or through an indirect connection via other devices and connections. The recitation "based on" means "based at least in part on." Therefore, if X is based on Y, X may be a function of Y and any number of other factors.

Modifications are possible in the described embodiments, and other embodiments are possible, within the scope of the claims.

What is claimed is:
1. An apparatus, comprising:
a boost converter, wherein the boost converter comprises:
a switch;
a boost loop filter coupled to the switch; and a peak current adjustment circuit coupled to the boost loop filter, wherein the peak current adjustment circuit comprises a comparator and a gain control circuit coupled to differential inputs of the comparator, wherein the boost loop filter is configured to provide a control signal to the switch based on an output voltage of the boost converter and a peak current adjustment provided by the peak current adjustment circuit;

wherein the gain control circuit is configured to apply a first gain to the differential inputs of the comparator while the switch is turning on and to apply a second gain to the differential inputs of the comparator after the switch is turned on, and wherein the second gain is higher than the first gain.

2. The apparatus of claim 1, wherein the first gain is 50% and the second gain is 100%.

3. An apparatus, comprising:
a boost converter, wherein the boost converter comprises:
a switch;
a boost loop filter coupled to the switch; and
a peak current adjustment circuit coupled to the boost loop filter, wherein the peak current adjustment circuit comprises a comparator and a pain control circuit coupled to differential inputs of the comparator, wherein the boost loop filter is configured to provide a control signal to the switch based on an output voltage of the boost converter and a peak current adjustment provided by the peak current adjustment circuit;

wherein the gain control circuit is configured to apply at least three different gains to the differential inputs of the comparator during a switching cycle for the switch, and wherein the at least three different gains increase during the switching cycle.

4. An apparatus, comprising:
a boost converter, wherein the boost converter comprises:
a switch;
a boost loop filter coupled to the switch; and
a peak current adjustment circuit coupled to the boost loop filter, wherein the peak current adjustment circuit comprises a comparator and a pain control circuit coupled to differential inputs of the comparator, wherein the boost loop filter is configured to provide a control signal to the switch based on an output voltage of the boost converter and a peak current adjustment provided by the peak current adjustment circuit;

wherein the boost converter further comprises:
a reference current source coupled to a first input of the gain control circuit and configured to provide a reference current; and
an inductor coupled to a second input of the gain control circuit, wherein the comparator is configured to compare a scaled differential voltage output from the gain control circuit, wherein the scaled differential voltage is based on a first voltage value corresponding to the reference current and a second voltage value corresponding to an inductor current.

5. An apparatus, comprising:
a boost converter, wherein the boost converter comprises:
a switch;
a boost loop filter coupled to the switch; and
a peak current adjustment circuit coupled to the boost loop filter, wherein the peak current adjustment circuit comprises a comparator and a gain control circuit coupled to differential inputs of the comparator, wherein the boost loop filter is configured to provide a control signal to the switch based on an output voltage of the boost converter and a peak current adjustment provided by the peak current adjustment circuit;

wherein the boost converter further comprises a current limit control circuit configured to adjust a current limit in response to the peak current adjustment provided by the peak current adjustment circuit.

6. The apparatus of claim 5, wherein the current limit control circuit accounts for different inductor values.

7. The apparatus of claim 5, wherein the current limit control circuit comprises:
a look-up table (LUT) of values based on an input supply voltage (VIN) value and an output supply voltage (VOUT) value of the boost converter;
a scaling stage configured to scale an output of the LUT based on an adjustable inductor value; and
a summation stage configured to add an output of the scaling stage to a predetermined current limit value.

8. A system, comprising:
a boost converter;
a battery coupled to an input of the boost converter;
a load coupled to an output of the boost converter, wherein the boost converter comprises:
a switch;
a boost loop filter coupled to the switch; and
a peak current adjustment circuit coupled to the boost loop filter, wherein the peak current adjustment circuit is configured to provide a peak current adjustment to the boost loop filter, wherein the peak current adjustment circuit comprises:
a comparator; and
a gain control circuit coupled to differential inputs of the comparator;

wherein the boost converter further comprises a current limit control circuit configured to adjust a current limit of the boost converter in response to the peak current adjustment provided by the peak current adjustment circuit.

9. The system of claim 8, wherein the current limit control circuit is configured to adjust the current limit based on an input supply voltage (VIN) of the boost converter, an output supply voltage (VOUT) of the boost converter, and an adjustable inductor value.

10. A system, comprising:
a boost converter;
a battery coupled to an input of the boost converter;
a load coupled to an output of the boost converter, wherein the boost converter comprises:
a switch;
a boost loop filter coupled to the switch; and
a peak current adjustment circuit coupled to the boost loop filter, wherein the peak current adjustment circuit is configured to provide a peak current adjustment to the boost loop filter, wherein the peak current adjustment circuit comprises:
a comparator; and
a gain control circuit coupled to differential inputs of the comparator;

wherein the gain control circuit comprises a capacitive network with programmable switches, wherein the gain control circuit is configured to apply a first gain to the differential inputs of the comparator while the switch is turning on and to apply a second gain to the differential inputs of the comparator after the switch is turned on, and wherein the second gain is higher than the first gain.

11. A boost converter, comprising:
a reference current sense node;
an inductor current sense node;
a peak current adjustment circuit coupled to the reference current sense node and the inductor current sense node, wherein the peak current adjustment circuit comprises:
a comparator; and
a gain control circuit coupled to differential inputs of the comparator;
further comprising a current limit control circuit configured to adjust a current limit of the boost converter in response to a peak current adjustment provided by the peak current adjustment circuit.

12. The boost converter of claim 11, wherein the current limit control circuit is configured to adjust the current limit based on an input supply voltage (VIN) of the boost converter, an output supply voltage (VOUT) of the boost converter, and an adjustable inductor value.

13. A boost converter, comprising:
a reference current sense node;
an inductor current sense node;
a peak current adjustment circuit coupled to the reference current sense node and the inductor current sense node, wherein the peak current adjustment circuit comprises:
a comparator; and
a gain control circuit coupled to differential inputs of the comparator;
wherein the boost converter further comprises:
a switch; and
a boost loop filter coupled to the switch,
wherein the gain control circuit comprises a capacitive network with programmable switches, wherein the gain control circuit is configured to apply a first gain to the differential inputs of the comparator while the switch is turning on and to apply a second gain to the differential inputs of the comparator after the switch is turned on, and wherein the second gain is higher than the first gain.

14. The boost converter of claim 13, wherein the boost loop filter comprises:
a voltage-to-current (V2I) converter configured to add a minimum bias current to a feedback node; and
a diode configured to block current output from the V2I converter.

* * * * *